United States Patent
Johnson et al.

(10) Patent No.: US 8,689,771 B2
(45) Date of Patent: Apr. 8, 2014

(54) SHAPE MEMORY ALLOY-BASED DEVICE FOR CONTROLLING OR MONITORING PRESSURE IN A SYSTEM

(75) Inventors: Nancy L. Johnson, Northville, MI (US); Alan L. Browne, Grosse Pointe, MI (US); Xiujie Gao, Troy, MI (US); Paul W. Alexander, Ypsilanti, MI (US); Nicholas W. Pinto, IV, Ferndale, MI (US); Richard J. Skurkis, Lake Orion, MI (US); Scott R. Webb, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 245 days.

(21) Appl. No.: 13/173,276

(22) Filed: Jun. 30, 2011

(65) Prior Publication Data

US 2013/0000776 A1 Jan. 3, 2013

(51) Int. Cl.
*F02M 69/54* (2006.01)
*F02M 69/46* (2006.01)

(52) U.S. Cl.
USPC .......................................... 123/457; 123/463

(58) Field of Classification Search
USPC .................. 123/457, 459, 463, 464, 465; 251/129.06; 340/442; 73/146.2
See application file for complete search history.

(56) References Cited

U.S. PATENT DOCUMENTS

| | | | | |
|---|---|---|---|---|
| 5,045,064 | A * | 9/1991 | Idriss | 604/132 |
| 7,204,472 | B2 * | 4/2007 | Jones et al. | 251/129.06 |
| 7,686,120 | B2 * | 3/2010 | Browne et al. | 180/274 |
| 8,083,990 | B2 * | 12/2011 | Ishida et al. | 420/95 |
| 2001/0002226 | A1 * | 5/2001 | Tanaka et al. | 396/440 |
| 2005/0199845 | A1 * | 9/2005 | Jones et al. | 251/129.06 |
| 2005/0230195 | A1 * | 10/2005 | Jones et al. | 188/68 |
| 2006/0186706 | A1 * | 8/2006 | Browne et al. | 296/203.01 |
| 2007/0063540 | A1 * | 3/2007 | Browne et al. | 296/180 |
| 2009/0020291 | A1 * | 1/2009 | Wagner et al. | 166/332.7 |
| 2009/0315696 | A1 * | 12/2009 | Browne et al. | 340/442 |

* cited by examiner

*Primary Examiner* — Mahmoud Gimie
(74) *Attorney, Agent, or Firm* — Quinn Law Group, PLLC

(57) ABSTRACT

A device is provided that may be adapted to control or monitor the pressure level of a fluid system. The device includes a member composed of a shape memory alloy in a superelastic state. The member is configured to undergo a phase change from a high modulus Austenitic phase to a low modulus Martensitic phase and stretch in response to an activation stress. In one embodiment, the member defines two ends such that one end of the member is operatively connected to a fixed point. Another end of the member is operatively connected to a movable element. As the member stretches in response to the activation stress, the movable element is translated relative to the fixed point. In another embodiment, the member includes two plates with respective holes that are selectively aligned when the first and second plates stretch or deform in response to the activation stress.

13 Claims, 5 Drawing Sheets

SHAPE MEMORY ALLOY-BASED DEVICE FOR CONTROLLING OR MONITORING PRESSURE IN A SYSTEM

TECHNICAL FIELD

The invention generally relates to a device that may be adapted to control or monitor the pressure level of a fluid system. More specifically, the device is based on a shape memory alloy.

BACKGROUND

Active materials include those compositions that exhibit a change in stiffness properties, shape and/or dimensions in response to an activation signal, which can be mechanical (stress or strain), electrical, magnetic, thermal or a like field depending on the different types of active materials. Shape memory alloys, a class of active materials, when in their Austenitic phase state, have the ability to reversibly deform in response to an activation stress.

SUMMARY

A device is provided that may be adapted to control or monitor a pressure level for a fluid system. The device includes a member composed of a shape memory alloy in an Austenitic phase state. The member is configured to undergo a phase change from a high modulus Austenitic phase to a low modulus Martensitic phase in response to an activation stress. The phase change is accompanied by stretching of the member; this stretching, which is reversible, being termed superelasticity. In one embodiment, the member defines two ends such that one end of the member is operatively connected to a fixed point. Another end of the member is operatively connected to a movable element. As the member stretches in response to the activation stress, the movable element is translated relative to the fixed point. The device may be configured as a pressure relief valve. Unlike conventional pressure relief valves, the movable element remains un-actuated until the point at which the activation stress occurs, thereby maintaining a substantially step-function control of pressure. Alternatively, the device may be configured as a pressure monitoring device. Alternatively, the device may be configured as a lockout device to selectively prevent removal of a cap of an assembly.

In another embodiment, the member includes a first plate having at least one first hole and operatively connected to or flanking a second plate which has at least one second hole. The second plate is configured to undergo a phase change from a high modulus Austenitic phase to a low modulus Martensitic phase and deform in response to an activation stress. As the second plate deforms in response to the activation stress, it bows outward, thereby selectively permitting a flow of fluid from a first region to a second region of the fluid system.

The above features and advantages and other features and advantages of the present invention are readily apparent from the following detailed description of the best modes for carrying out the invention when taken in connection with the accompanying drawings.

DETAILED DESCRIPTION

Figure 1:
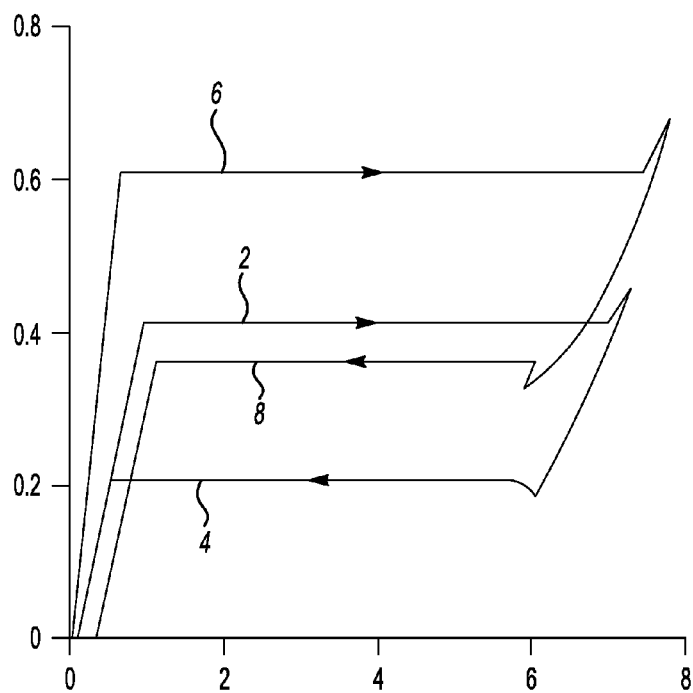
FIG. 1 is a graphical illustration of properties of a shape memory alloy in a superelastic mode.

A device is provided that may be adapted to control or monitor a pressure level for a fluid system. The device includes a member composed of a shape memory alloy in an Austenitic phase state which exhibits a superelastic response to an applied stress (resulting from a pressure differential). Referring to the drawings, FIG. 1 graphically illustrates physical properties of a shape memory alloy in a superelastic mode. The shape memory alloy is formed from a nickel titanium alloy having an Austenite finish temperature less than that encountered in the use environment for an application, which in the case of the land transportation industry is about −40° Celsius. In the example here this was chosen to be 0° Celsius. The y-axis indicates stress or pressure in GPa and the x-axis indicates percentage change in strain. At an activation stress level, a shape memory alloy exhibits a stress-induced phase change from a high modulus Austenitic phase to a low modulus Martensitic phase and an accompanying significant reversible stretching of the shape memory alloy, with little further increase in stress, this being termed superelasticity. In other words, the shape memory alloy deforms pseudoelastically and reversibly, up to 8%, at a nearly constant stress.

Referring to FIG. 1, line 2 illustrates a 7% change in strain during deformation under an activation stress of approximately 0.4 GPa at a temperature of about 30 Celsius. As shown by line 4 in FIG. 1, the shape memory alloy reverses the deformation at a return stress or pressure level of approximately 0.2 GPa, at a temperature of about 30 Celsius. Line 6 in FIG. 1 illustrates an almost 8% change in strain during deformation under an activation stress of approximately 0.6 GPa at a temperature of about 50 Celsius. Referring to line 8, the shape memory alloy reverses the deformation at a return stress or pressure level of approximately 0.36 GPa at a temperature of about 50 Celsius.

A number of embodiments for the device are described below. Each device includes a member composed of a shape memory alloy in an Austenitic phase state. The member formed from the shape memory alloy may have any suitable form or shape. For example, the member may have a form selected from the group of springs, tapes, wires, bands, loops, ribbons, braids, cables, weaves, plate, sheet and combinations thereof. Further, the shape memory alloy may have any suitable composition. In particular, the shape memory alloy may include in combination an element selected from the group of cobalt, nickel, titanium, indium, manganese, iron, palladium, zinc, copper, silver, gold, cadmium, tin, silicon, platinum, and gallium. For example, suitable shape memory alloys may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations of one or more of each of these combinations. The shape memory alloy may be selected according to desired operating temperatures of the particular application. In one specific example, the shape memory alloy may include nickel and titanium.

Figure 2:
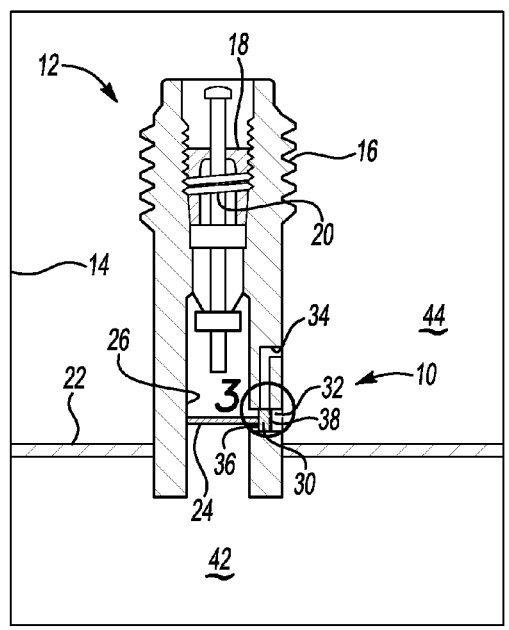
FIG. 2 is a schematic fragmentary partly sectional view of a first embodiment of a device in accordance with the present disclosure.
Figure 3:
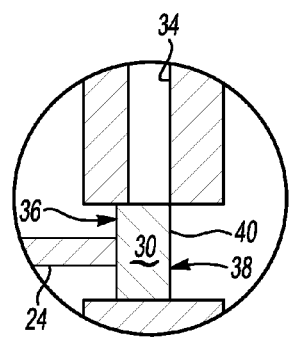
FIG. 3 is a schematic enlarged view of a portion of FIG. 2, showing a piston in a first position.
Figure 4:
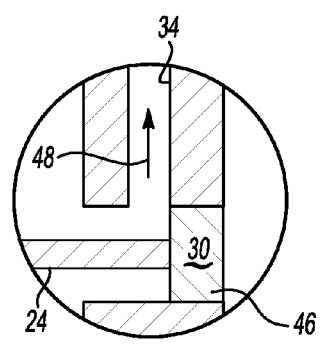
FIG. 4 is a schematic enlarged view of a portion of FIG. 2, showing the piston in a second position.

Referring to FIGS. 2-4, a device 10 illustrating a first embodiment is shown. The device 10 is configured as a pressure relief valve for a fluid system. As used herein, fluid includes both gases and liquids. Referring to FIG. 2, while being general in application to all pressurized fluid systems, the example fluid system illustrated here is part of a tire assembly 12 of a vehicle 14. The tire assembly 12 includes a valve stem 16 into which a valve core 18 is threaded. The valve core 18 may be a poppet valve surrounded by a spring 20. The valve stem 16 opens to admit air into a tire 22 and is then automatically closed and kept sealed by the pressure in the tire 22 or by the spring 20, or both. The device 10 includes a member 24 composed of a shape memory alloy in an Austenitic phase state. One end of the member 24 is operatively connected to a fixed point of the tire assembly 12, such as wall 26 of the valve stem 16. Another end of the member 24 is attached to a movable element, such as piston 30. The piston 30 is positioned within a groove 32, at least partially defined by the valve stem 16. The groove 32 is fluidly connected to a port 34. A first face 36 of the piston is subject to a first pressure $P_1$, which is the pressure within the tire 22. A second face 38 of the piston 30 is subject to a second pressure $P_2$, which is the pressure outside the tire 22. The pressure differential (difference between $P_1$ and $P_2$) across the first and second faces 36, 38 of the piston 30 results in stress or tension in the member 24.

When the pressure differential is below a first critical value, the piston 30 assumes a first position 40, shown in FIG. 3, which substantially prevents the flow of air through the port 34, from a first region 42 inside the tire 22 to a second region 44 outside the tire 22. As the first pressure $P_1$ increases relative to the second pressure $P_2$, the tension in the member 24 rises. When the pressure differential exceeds a first critical value, the member 24 undergoes a phase change from a high modulus Austenitic phase to a low modulus Martensitic phase. The phase change is accompanied by reversible stretching (superelastic deformation) of the member 24 from its original length. In one embodiment, the member stretches by approximately 8% of its original length. As the member 24 stretches, the piston 30 is moved or translated to a second position 46, shown in FIG. 4, which substantially permits the flow of air through the port 34 from the first region 42 inside the tire 22 to the second region 44 outside the tire 22, as shown by arrow 48.

As excess fluid is vented through the port 34, the pressure differential across the first and second faces 36, 38 of the piston 30 is reduced, thereby reducing the tension in the member 24. As the pressure differential reduces to a second critical value, the member 24 resets or contracts to its original length and the piston 30 re-assumes the first position 40 (shown in FIG. 3), which substantially prevents the flow of fluid from the first region 42 to the second region 44. Thus, the device 10 passively maintains a specific pressure range in the tire 22 through utilizing the nearly constant deformation stress deformation stress exhibited by the shape memory alloy during stress induced phase transformation, i.e. superelasticity. The piston 30 remains un-actuated until the pressure differential exceeds the first critical value, thereby maintaining an approximately step-function control of the system pressure. The device 10 may be employed in any assembly requiring a pressure relief valve, in both automotive and non-automotive applications.

Figure 5:
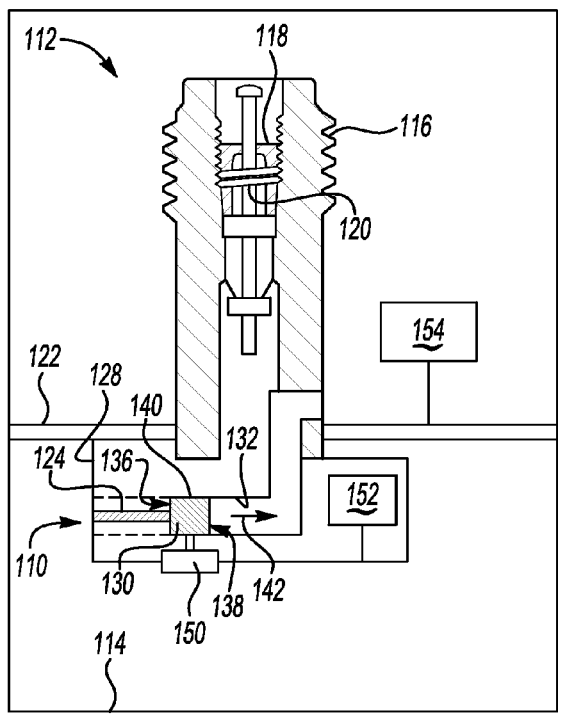
FIG. 5 is a schematic fragmentary partly sectional view of a second embodiment of a device in accordance with the present disclosure.

Referring to FIG. 5, a device 110 illustrating a second embodiment is shown. The device 110 is configured as a pressure monitoring device for a fluid system. The fluid system may be part of a tire assembly 112 of a vehicle 114, shown in FIG. 3. The tire assembly 112 includes a valve stem 116 into which a valve core 118 is threaded. The valve core 118 is a poppet valve surrounded by a spring 120. The valve stem 116 opens to admit air into a tire 122 and is then automatically closed and kept sealed by the pressure in the tire 122 or by the spring 120, or both. The device 110 includes a member 124 composed of a shape memory alloy in an Austenitic phase state. One end of the member 124 is operatively connected to a fixed point, such as a wall 128. Another end of the member 124 is attached to a movable element, such as piston 130. The piston 130 is positioned and movable within a groove 132. Referring to FIG. 5, a first face 136 of the piston 130 is subject to a first pressure $P_1$, which is the pressure within the tire 122. A second face 138 of the piston 130 is subject to a second pressure $P_2$, which is the pressure outside the tire 122. The pressure differential (difference between $P_1$ and $P_2$) across the first and second faces 136, 138 of the piston 130 results in stress or tension in the member 124.

Referring to FIG. 5, when the pressure differential is below a first critical value, the piston 130 assumes a first position 140. As the first pressure $P_1$ increases relative to the second pressure $P_2$, the tension in the member 124 rises. When the pressure differential exceeds a first critical value, the member 124 undergoes a phase change from a high modulus Austenitic phase to a low modulus Martensitic phase. The phase change is accompanied by stretching of the member 124 from its original length. In one embodiment, the member 124 stretches approximately 8% of its original length. As the member 124 stretches, piston 130 is moved or translated in the groove 132 in a first direction 142. As the pressure differential reduces to a second critical value, the member 124 resets or contracts to its original length and the piston 130 is translated within the groove 132 in a second direction (opposite to the direction 142) towards the first position 140. A position sensor 150 is operatively connected to the piston 130 for monitoring the position of the piston 130, which reflects the pressure differential in the tire 122. Referring to FIG. 5, a transmitter 152 transmits the position data of the piston 130 to a receiver 154 in the vehicle 114. The receiver 154 collects the position data of the piston 130 and may be configured to convert the position data to reflect real-time tire-pressure information (e.g. in pressure per square inch) of the tire 122.

The receiver 154 may be configured to report the real-time tire-pressure information to a driver of the vehicle 114, for example through a dashboard display or a low-pressure warning light.

Figure 6:
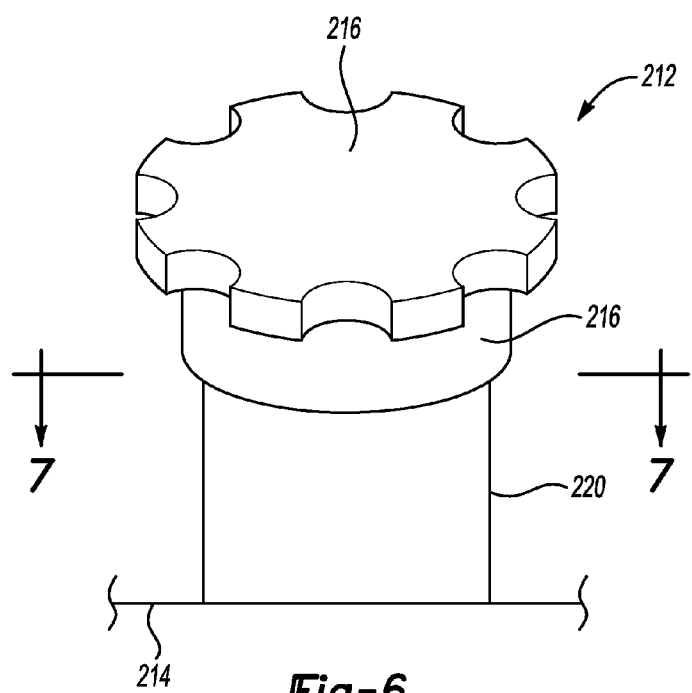
FIG. 6 is a schematic perspective illustration of a portion of a radiator assembly in a vehicle.
Figure 7:
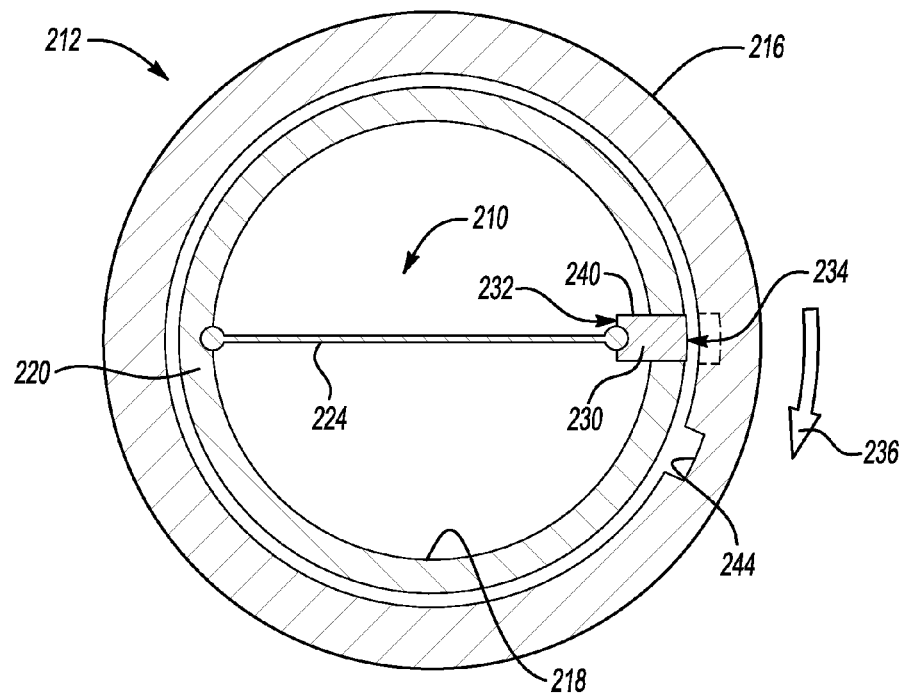
FIG. 7 is a schematic sectional view of a third embodiment of a device in accordance with the present disclosure, taken through axis 7-7 of FIG. 6, showing a piston in a first position.
Figure 8:
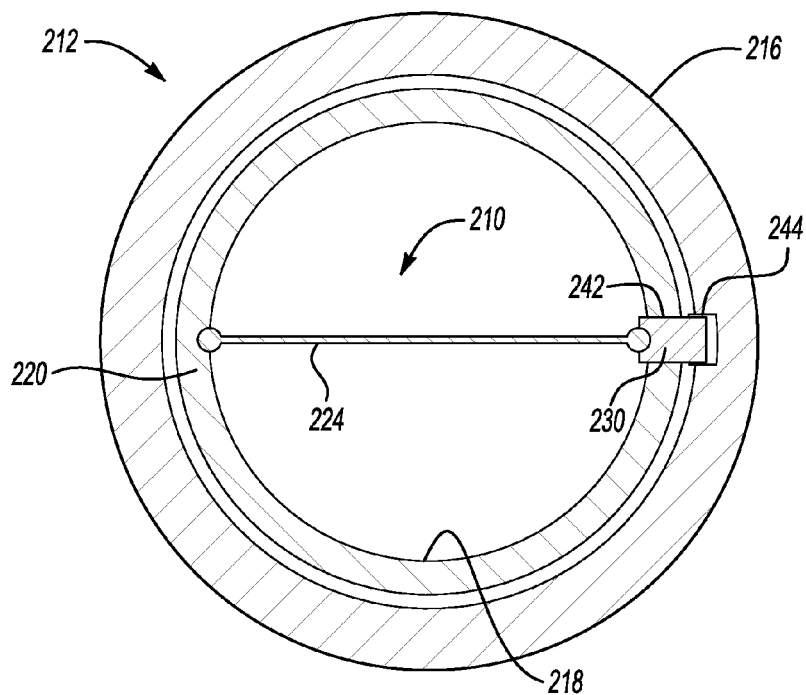
FIG. 8 is a schematic sectional view of the device of FIG. 7, showing the piston in a second position.

Referring to FIGS. 6-8, a device 210 illustrating a third embodiment is shown. The device 210 is configured as a lock-out device for a lid or cap of an assembly. The device 210 may be employed in any assembly requiring a cap, in both automotive and non-automotive applications. FIG. 6 illustrates a portion of a radiator assembly 212 of a vehicle 214. The radiator assembly 212 includes a cap 216 configured to cover an opening 218 of a housing 220. Referring to FIGS. 7-8, the device 210 includes a member 224 composed of a shape memory alloy in an Austenitic phase state. One end of the member 224 is operatively connected to a fixed point, such as housing 220. Another end of the member 224 is attached to a movable element, such as piston 230. A first face 232 of the piston 230 is subject to a first pressure $P_1$, which is the pressure inside the radiator assembly 212. A second face 234 of the piston 230 is subject to a second pressure $P_2$, which is the pressure outside the radiator assembly 212. The pressure differential (difference between $P_1$ and $P_2$) across the first and second faces 232, 234 of the piston 230 results in stress or tension in the member 224.

Referring to FIG. 7, when the pressure differential is below a first critical value, the piston 230 is in a first position, which allows the cap 216 to be removed by rotation in the direction 236. When the pressure differential exceeds a first critical value, the member 224 undergoes a phase change from a high modulus Austenitic phase to a low modulus Martensitic phase. The phase change is accompanied by stretching of the member 224 from its original length. In one embodiment, the member 224 stretches by approximately 8% of its original length. Referring to FIG. 8, as the member 224 stretches, the piston 230 is moved or translated to a second position 242 and engages with a notch 244 in the cap 216, thereby preventing rotation and removal of the cap 216. Thus, the device 210 prevents an inadvertent manual release of over-pressurized fluid in a radiator assembly 212. As the pressure differential reduces to a second critical value, the member 224 resets or contracts to its original length and the piston 230 re-assumes the first position 240 shown in FIG. 7, disengaging from the notch and allowing removal of the cap 216.

Figure 9:
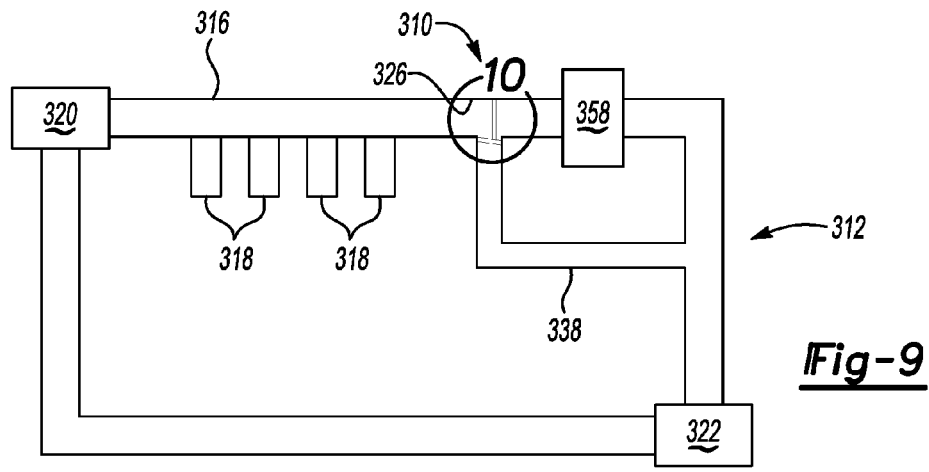
FIG. 9 is a schematic illustration of a fourth embodiment of a device in accordance with the present disclosure.
Figure 10:
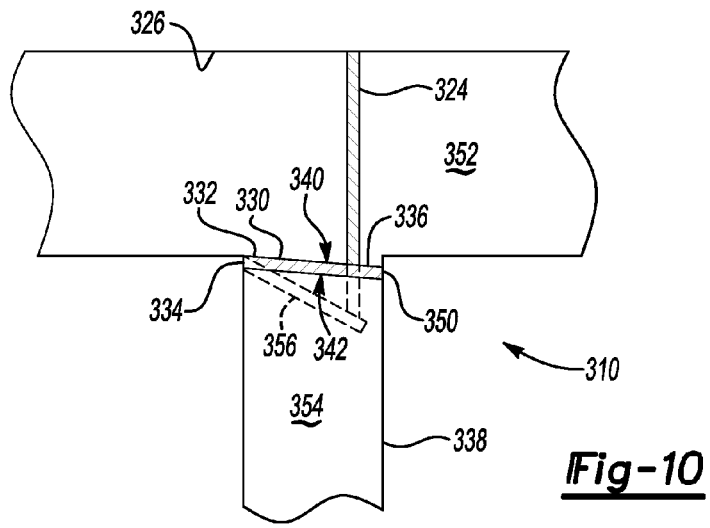
FIG. 10 is a schematic enlarged view of a portion of FIG. 9.

Referring to FIGS. 9-10, a device 310 illustrating a fourth embodiment is shown. The device 310 is configured as a pressure relief valve for a fluid system. The fluid system may be a fuel line assembly 312 of a vehicle, as shown in FIG. 9. The device 310 may be employed in any assembly requiring a pressure relief valve, in both automotive and non-automotive applications. Referring to FIG. 9, the assembly 312 includes a fuel rail 316 delivering fuel to individual fuel injectors 318 of the vehicle. The assembly 312 includes a high-pressure fuel pump 320 and a fuel tank 322. FIG. 10 is an enlarged view of a portion of FIG. 9. Referring to FIG. 10, the device 310 includes a member 324 composed of a shape memory alloy in an Austenitic phase state. One end of the member 324 is operatively connected to a fixed point of the assembly 312, such as a wall 326 positioned inside the fuel rail 316. Another end of the member 324 is attached to a movable element, such as valve 330. Referring to FIG. 10, a first end 332 of the valve 330 is operatively connected to a fixed point of the assembly 312 (such as junction 334 between the fuel rail 316 and a bypass 338) such that the second end 336 of the valve 330 is able to rotate.

Referring to FIG. 10, a first face 340 of the valve 330 is subject to a first pressure $P_1$, which is the pressure in a first region 352 inside the fuel rail 316. The second face 342 of the valve 330 is subject to a second pressure $P_2$, which is the pressure in a second region 354 outside the fuel rail 316 and in the bypass 338. The pressure differential (difference between $P_1$ and $P_2$) across the first and second faces 340, 342 of the valve 330 results in stress or tension in the member 324.

Referring to FIG. 10, when the pressure differential is below a first critical value, the valve 330 assumes a first position 350, which substantially prevents the flow of fluid from the first region 352 to the second region 354. As the first pressure $P_1$ increases relative to the second pressure $P_2$, the tension in the member 324 rises. When the pressure differential exceeds a first critical value, the member 324 undergoes a phase change from a high modulus Austenitic phase to a low modulus Martensitic phase. The phase change is accompanied by reversible stretching of the member 324 from its original length. In one embodiment, the member 324 stretches approximately 8% of its original length. Referring to FIG. 10, as the member 324 stretches, the valve 330 is moved to a second position 356 (shown in phantom) which substantially permits the flow of fluid from the first region 352 to the second region 354. This allows excess fluid or fuel from the fuel rail 316 to flow or be vented from the fuel rail 316 to the fuel tank 322, through the bypass 338, leading to a reduction in the pressure differential across the first and second faces 340, 342 of the valve 330. As the pressure differential reduces to above a second critical value, the member 324 resets or contracts to its original length and the valve 330 re-assumes the first position 350, which substantially prevents the flow of fluid from the first region 352 to the second region 354.

Thus, the device 310 passively maintains a specific pressure in the assembly 312 through utilizing the nearly constant deformation stress of the shape memory alloy as it reversibly deforms "superelastically" due to the stress induced phase change from Austenite to Martensite. Typically, a pressure regulator or solenoid 358 is positioned adjacent to the fuel rail 316, as shown in FIG. 9. The solenoid 358 controls pressure by opening a return line to the fuel tank 322. Because the device 310 passively controls pressure, it may be employed as a back-up to the solenoid 358, for example, in the event of a power failure. Alternatively, the device 310 may be employed as a replacement for the solenoid 358.

Figure 11:
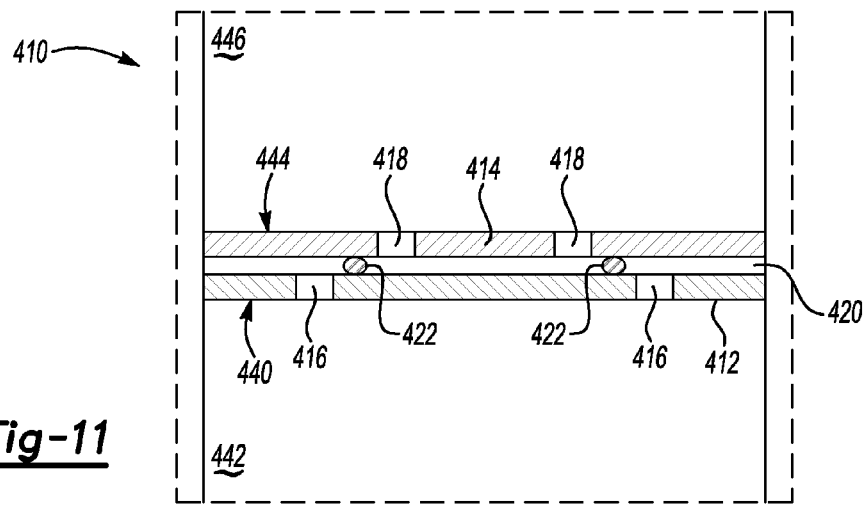
FIG. 11 is a schematic illustration of a fifth embodiment of a device in accordance with the present disclosure, in a first position.
Figure 12:
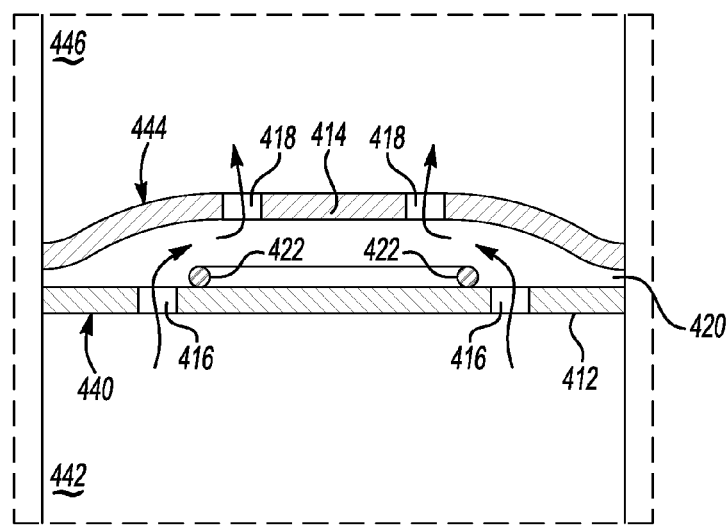
FIG. 12 is a schematic illustration of the device of FIG. 11, in a second position.
Figure 13:
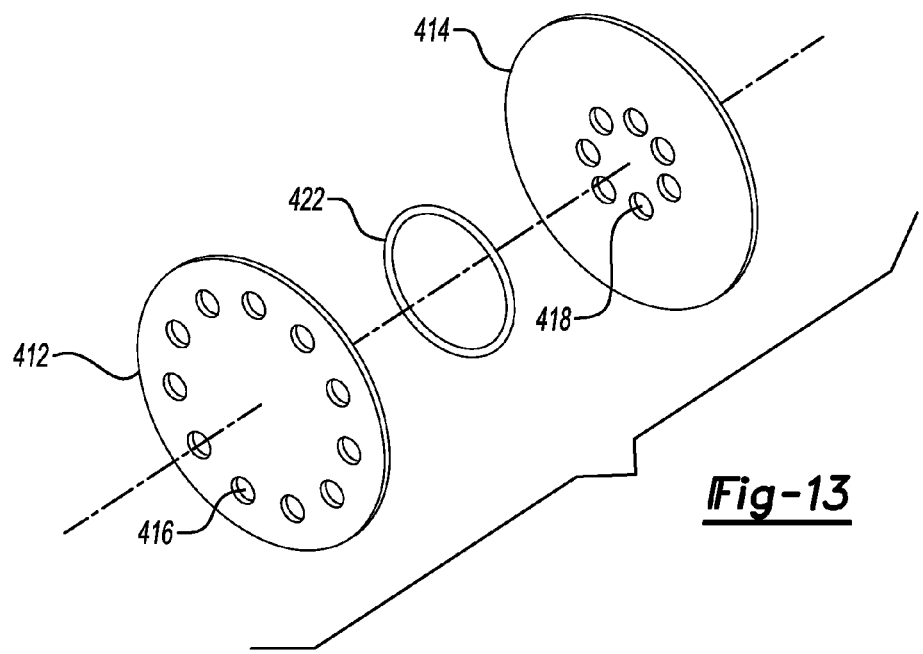
FIG. 13 is an exploded perspective view of a portion of the device of FIG. 11.

Referring to FIGS. 11-13, a device 410 illustrating a fifth embodiment is shown. The device 410 includes a first plate 412 having a high bending stiffness which could be achieved, for example, through being made of a high modulus material such as steel and/or an appropriate section thickness. The first plate 42 is made of a first material configured to provide substantial stiffness and minimize deformation under the pressures encountered in a particular application. The first plate 412 is operatively connected to or flanks a second plate 414 composed of the shape memory alloy in an Austenitic phase. FIG. 13 is an exploded view showing the first and second plates 412, 414 and a seal ring 422. Referring to FIGS. 11-12, the seal ring 422 is positioned between the first and second plates 412, 414. As shown in FIGS. 11-13, the first plate 412 includes one or more first holes 416 while the second plate 414 includes one or more second holes 418, the respective holes in the two plates 412, 414 not being aligned.

Figure 14:
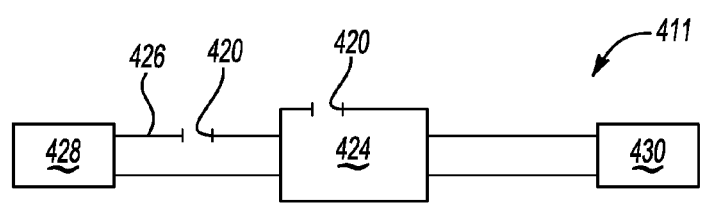
FIG. 14 is a schematic diagram of a portion of an exhaust assembly in a vehicle.

The device 410 may be configured as a pressure relief valve for a fluid system. The device 410 may be employed in any assembly requiring a pressure relief valve, in both automotive and non-automotive applications. FIG. 14 is a schematic diagram of a portion of an exhaust assembly 411 in a vehicle. Referring to FIG. 14, in one example, the device 410 is employed in an exhaust assembly 411 having a catalytic converter 424. The catalytic converter 424 is used to reduce emissions from an engine 428. An inlet pipe 426 feeds the catalytic converter 424 and is operatively connected to the engine 428. The catalytic converter 424 may be operatively connected to a muffler 430.

Referring to FIGS. 11, 12 and 14, the first and second plates 412, 414 may be fitted into an aperture 420 in the catalytic converter 424 or inlet pipe 426. Referring to FIG. 11-12, a first face 440 of the first plate 412 is subject to a first pressure $P_1$, which is the pressure in a first region 442 of the assembly 412. In one embodiment, the first region 442 is inside the catalytic converter 424 (shown in FIG. 14). In another embodiment, the first region 442 is inside the inlet pipe 426 (shown in FIG. 14). A second face 444 of the second plate 414 is subject to a second pressure $P_2$, which is the pressure in a second region 446 of the assembly 412. The pressure differential (difference between $P_1$ and $P_2$) across the first and second faces 440, 444 results in stress or tension in the first and second plates 412, 414.

Referring to FIG. 11, when the pressure differential is below a first critical value, the first and second holes 416, 418 are unaligned, thereby substantially preventing the flow of fluid from the first region 442 to the second region 446. As the pressure differential increases, the stress in the first and second plates 412, 414 rises. As the pressure differential exceeds a first critical value, the second plate 414, comprised of an SMA material in Austenitic phase, undergoes a stress induced phase change from a high modulus Austenitic phase to a Martensitic phase. The phase change is accompanied by a stretching and bowing deformation of the second plate 414. Referring to FIG. 12, the second plate 414 is constrained around its perimeter such that the second plate 414 bows outwards. As shown in FIG. 12, the bowing of the second plate 414 is such that the pressurized fluid can pass through the holes 416 in the first plate 412 and subsequently through the holes 418 in the second plate 414, i.e. permitting the flow of fluid from the first region 442 to the second region 446.

As excess fluid is vented through the first and second holes 416, 418, the pressure differential across the first and second faces 440, 444 of the first and second plates 412, 414, respectively, is reduced. As the pressure differential reduces to a second critical value, the second plate 414 returns to the first position shown in FIG. 11, thereby substantially preventing the flow of fluid from the first region 442 to the second region 446. Based on the volume of flow required in a particular application, one of ordinary skill in the art can select the number, placement and sizes of the first and second holes 434, 436. Thus, the device 410 passively maintains a specific pressure in the assembly 412 through utilizing the nearly constant deformation stress of the shape memory alloy in a superelastic mode.

While the best modes for carrying out the invention have been described in detail, those familiar with the art to which this invention relates will recognize various alternative designs and embodiments for practicing the invention within the scope of the appended claims.

The invention claimed is:

1. A device for a fluid system, the device comprising:
   a member composed of a shape memory alloy in an Austenitic phase state and including one end operatively connected to a fixed point;
   a movable element operatively connected to another end of the member;
   a housing operatively connected to the member;
   a cap adapted to cover an opening in the housing;
   a notch defined by the cap;
   wherein the member is configured to undergo a phase change from a high modulus Austenitic phase to a low modulus Martensitic phase in response to an activation stress;
   wherein the member is configured to reversibly stretch with the phase change, thereby moving the movable element relative to the fixed point;
   wherein the member is disposed in contact with a first region of the fluid system;
   wherein the movable element includes first and second faces such that the first face is in contact with the first region;
   wherein the activation stress is defined by a pressure differential across the first and second faces of the movable element exceeding a first critical value; and
   wherein the movable element is configured to engage with the notch when the pressure differential exceeds the first critical value, thereby selectively preventing removal of the cap from the housing.

2. The device of claim 1, wherein the member is configured to reverse the phase change and contract when the pressure differential across the first and second faces of the movable element reaches a second critical value.

3. The device of claim 1, wherein the movable element is configured to disengage from the notch when the pressure differential reaches a second critical value, thereby allowing removal of the cap from the housing.

4. The device of claim 1, wherein:
   the movable element includes a first position which substantially prevents a flow of fluid from the first region to a second region of the fluid system; and
   the movable element includes a second position which substantially permits the flow of fluid from the first region to the second region.

5. The device of claim 4, further comprising:
   a tire operatively connected to the member; and
   wherein the first region is within the tire and the second region is outside the tire.

6. The device of claim 1, further comprising:
   a tire operatively connected to the member;
   a groove positioned within the tire;
   wherein the movable element translates within the groove in a first direction when the pressure differential exceeds the first critical value; and
   wherein the movable element translates within the groove opposite to the first direction when the pressure differential reaches a second critical value.

7. The device of claim 6, further comprising:
   a position sensor operatively connected to the movable element and configured to detect a position of the movable element;
   a transmitter configured to transmit the position of the movable element; and
   a receiver configured to receive the position of the movable element.

8. The device of claim 1, further comprising:
   a fuel rail operatively connected to the member; and
   wherein the first region is within the fuel rail and the second region is outside the fuel rail.

9. The device of claim 8, further comprising a fuel tank operatively connected to the fuel rail.

10. A device for a fluid system, the device comprising:
    a first plate composed of a first material configured to provide substantial stiffness and minimize deformation of the first plate and having at least one first hole;

a second plate connected to the first plate, the second plate being composed of the shape memory alloy in an Austenitic phase and having at least one second hole;
wherein the second plate is configured to undergo a stress induced phase change from a high modulus Austenitic phase to a Martensitic phase and bow in response to an activation stress; and
wherein the first and second holes are configured to allow fluid to pass when the second plate bows, thereby selectively permitting a flow of fluid from a first region to a second region of the fluid system.

11. The device of claim 10, further comprising:
a first face defined by the first plate and in contact with the first region;
a second face defined by the second plate and in contact with the second region; and
wherein the activation stress is defined by a pressure differential between the first and second faces exceeding a first critical value.

12. The device of claim 10, further comprising a seal ring positioned between the first and second plates.

13. The device of claim 10, further comprising:
a catalytic converter, the first and second plates being positioned in an aperture in the catalytic converter; and
wherein the first region is within the catalytic converter and the second region is outside the catalytic converter.

* * * * *